United States Patent
Lai (10) Patent No.: US 8,154,862 B2
(45) Date of Patent: Apr. 10, 2012

(54) OPEN EXTERNAL HARD DRIVE ENCLOSURE

(76) Inventor: Ping-Hung Lai, Yonghe (TW)

( * ) Notice: Subject to any disclaimer, the term of this patent is extended or adjusted under 35 U.S.C. 154(b) by 0 days.

(21) Appl. No.: 12/870,932

(22) Filed: Aug. 30, 2010

(65) Prior Publication Data

US 2012/0050978 A1 Mar. 1, 2012

(51) Int. Cl.
*G06F 1/16* (2006.01)
*H05K 5/00* (2006.01)
*H05K 7/00* (2006.01)

(52) U.S. Cl. .............................. 361/679.33; 361/679.39

(58) Field of Classification Search . 361/679.33–679.45
See application file for complete search history.

(56) References Cited

U.S. PATENT DOCUMENTS

| | | | | |
|---|---|---|---|---|
| 4,941,841 A * | 7/1990 | Darden et al. | ............. | 361/679.39 |
| 5,278,730 A * | 1/1994 | Kikinis | ..................... | 361/679.32 |
| 5,363,273 A * | 11/1994 | Ma | ............................. | 361/679.37 |
| 5,587,854 A * | 12/1996 | Sato et al. | .................. | 360/97.01 |
| 5,684,655 A * | 11/1997 | Fujimura | .................... | 360/97.01 |
| 5,831,820 A * | 11/1998 | Huang | ...................... | 361/679.38 |
| 6,040,979 A * | 3/2000 | Homer | ..................... | 361/679.37 |
| 6,108,199 A * | 8/2000 | Bonardi et al. | ........... | 361/679.37 |
| 6,385,042 B1 * | 5/2002 | Chen | ......................... | 361/679.41 |
| 6,563,701 B1 * | 5/2003 | Peng et al. | ............... | 361/679.34 |
| 6,563,714 B2 * | 5/2003 | Chang | ............................ | 361/752 |
| 6,587,350 B1 * | 7/2003 | Lin et al. | ........................ | 361/754 |
| 6,761,580 B2 * | 7/2004 | Chang | ............................ | 439/502 |
| 6,774,808 B1 * | 8/2004 | Hibbs et al. | ................. | 340/686.4 |
| 6,882,525 B2 * | 4/2005 | Paul et al. | ................. | 361/679.37 |
| 6,978,903 B2 * | 12/2005 | Son et al. | ........................ | 211/26 |
| 6,991,480 B2 * | 1/2006 | Katayanagi et al. | .......... | 439/159 |
| 6,992,897 B2 * | 1/2006 | Shimada et al. | ............... | 361/726 |
| 7,040,908 B2 * | 5/2006 | Kamata | .......................... | 439/159 |
| 7,203,060 B2 * | 4/2007 | Kay et al. | .................. | 361/679.35 |
| 7,215,506 B2 * | 5/2007 | Albrecht et al. | ........... | 360/97.01 |
| 7,515,410 B1 * | 4/2009 | Dingfelder et al. | ...... | 361/679.33 |
| 7,529,084 B2 * | 5/2009 | Liao et al. | ................. | 361/679.33 |
| 7,548,418 B2 * | 6/2009 | Martin et al. | ............ | 361/679.37 |
| 7,681,210 B2 * | 3/2010 | Jiang et al. | ..................... | 720/638 |
| 7,782,603 B2 * | 8/2010 | Curnalia et al. | ......... | 361/679.33 |
| 7,929,289 B2 * | 4/2011 | Tseng | ...................... | 361/679.39 |
| 2003/0112597 A1 * | 6/2003 | Smith | .......................... | 361/685 |
| 2004/0023522 A1 * | 2/2004 | Chang | ............................. | 439/43 |
| 2004/0095718 A1 * | 5/2004 | Salinas et al. | ................ | 361/685 |
| 2004/0100761 A1 * | 5/2004 | Liu | ................................. | 361/685 |
| 2006/0067061 A1 * | 3/2006 | Shimada et al. | ............... | 361/726 |
| 2006/0171110 A1 * | 8/2006 | Li | ................................. | 361/685 |
| 2008/0316684 A1 * | 12/2008 | Kilpinen | ...................... | 361/679 |
| 2010/0208423 A1 * | 8/2010 | Lai | ............................ | 361/679.38 |

* cited by examiner

*Primary Examiner* — Jayprakash N Gandhi
*Assistant Examiner* — Adrian S Wilson
(74) *Attorney, Agent, or Firm* — Alan Kamrath; Kamrath IP Lawfirm, PA (57) ABSTRACT

An open external hard drive enclosure has a body, a hard drive port, at least one computer port, a power input port and a control circuit. The control circuit is electrically connected with the hard drive port, the at least one computer port and the power input port. An open chamber is formed in the body, has an inner bottom, two opposite inner long sidewalls and an inner short sidewall, and matches a size of a hard drive. The hard drive port is formed on and extends toward the open chamber. A lever is pivotally mounted on the inner short sidewall and being adjacent to the hard drive port to push out, disengage and conveniently replace a hard drive received in the open chamber.

6 Claims, 9 Drawing Sheets

OPEN EXTERNAL HARD DRIVE ENCLOSURE

BACKGROUND OF THE INVENTION

1. Field of the Invention

The present invention is related to an external hard drive enclosure and, more particularly, to an open external hard drive enclosure for users to conveniently replace a hard drive inserted therein.

2. Description of the Related Art

Figure 7:
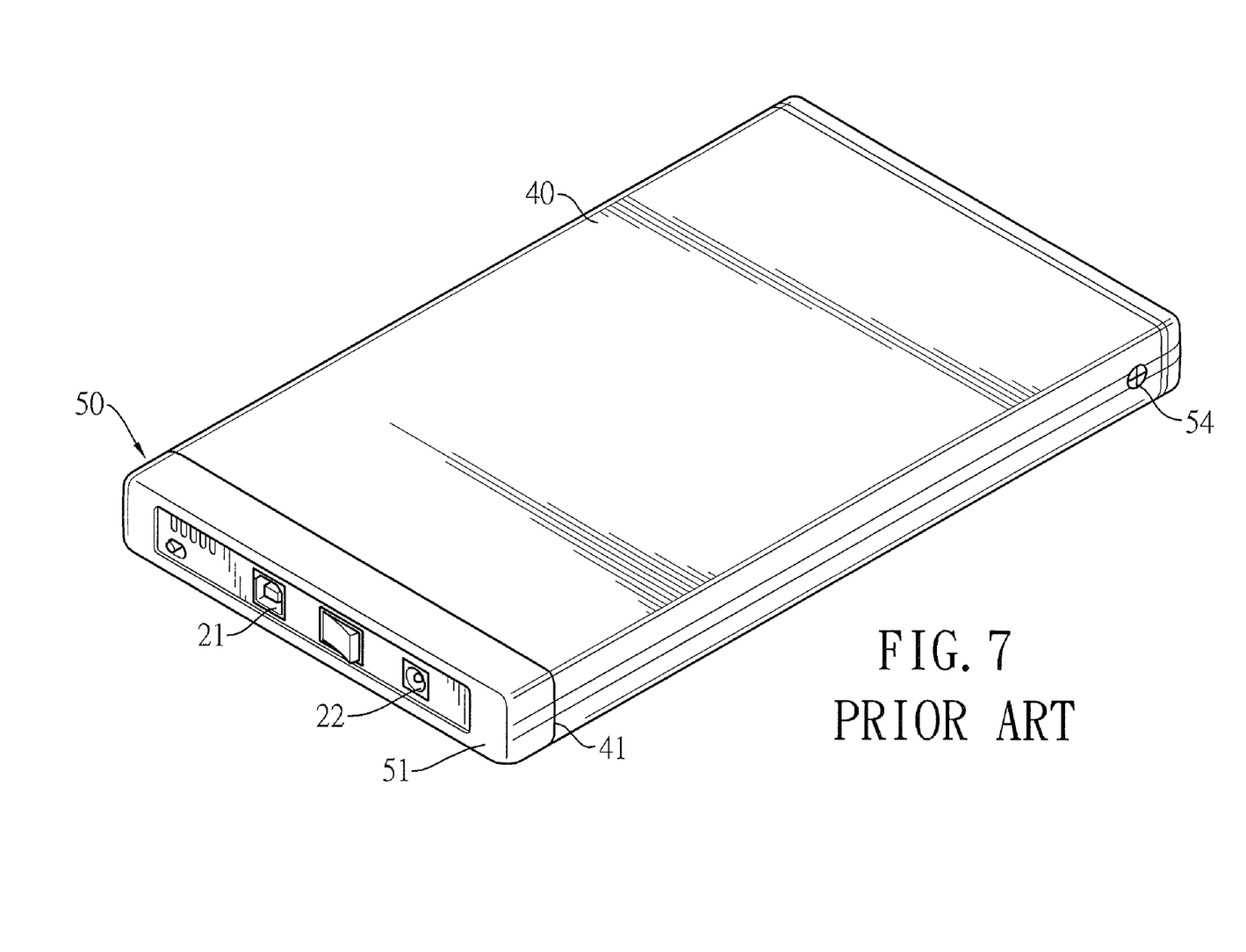
FIG. 7 is a perspective view of a conventional hard drive enclosure.
Figure 8:
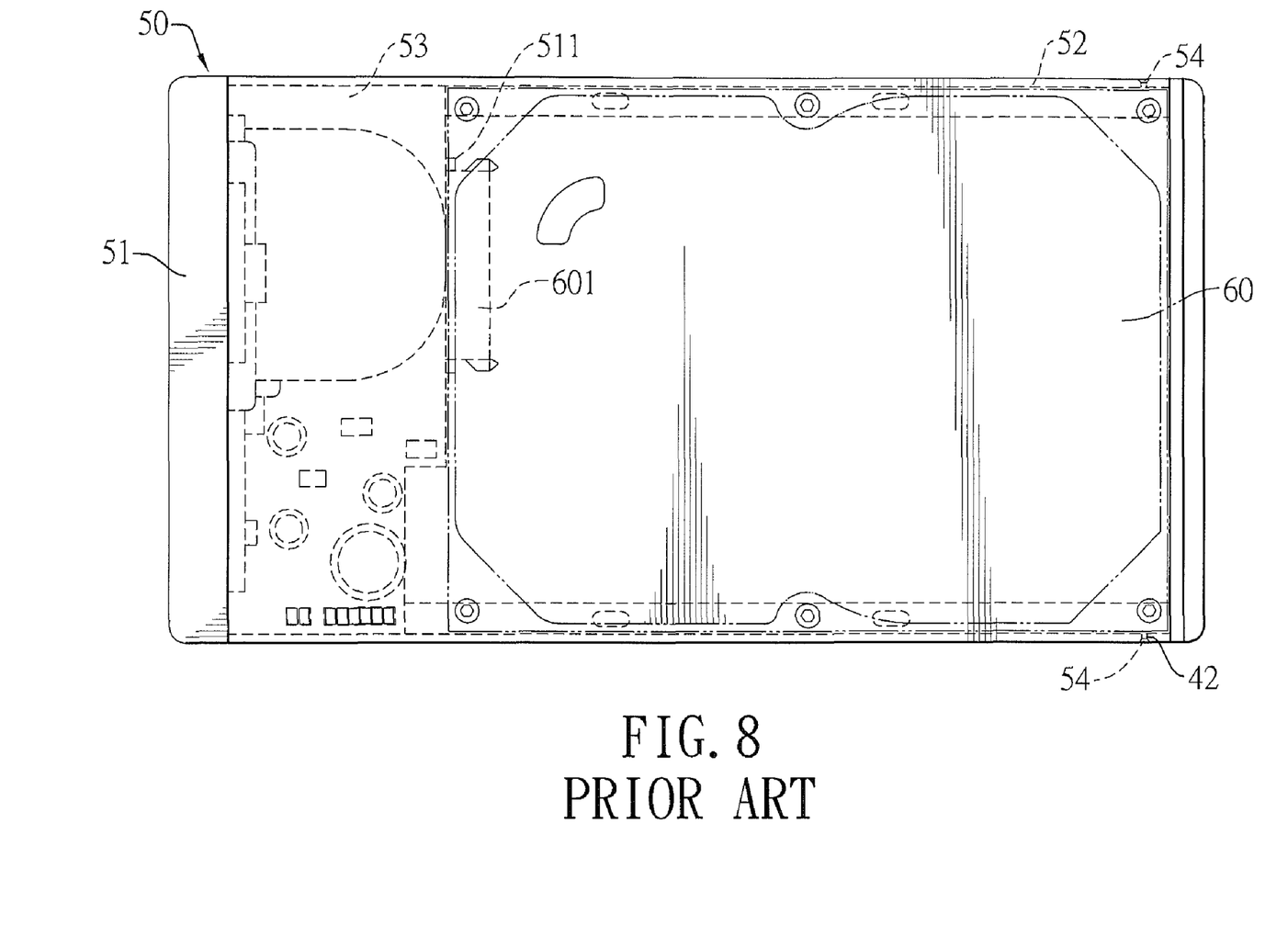
FIG. 8 is a top view of the conventional hard drive enclosure in FIG. 7.

With reference to FIGS. 7 and 8, a conventional external hard drive enclosure has a case 40 and a bridge device 50.

The case 40 is rectangular and hollow and has a front opening 41 and two screw holes 42. The front opening 41 is formed through a front side of the case 40. The two screw holes 42 are formed through two other opposite sides of the case 40.

The bridge device 50 has a control panel 51, a bracket 52 and a circuit board 53. The control panel 51 and the circuit board 53 are securely mounted on a side of the bracket 52 corresponding to the front opening 41 of the case 40. The circuit board 53 has a hard drive port 511, a computer port 21 and a power input port 22. The computer port 21 and the power input port 22 are exposedly formed on a side of the control panel 51 facing outside. The hard drive port 511 is formed on the side of the bracket 52 corresponding to the front opening 41 of the case 40. The bracket 52 is mounted in the case 40 through the front opening 41 of the case 40. Two screws 54 penetrate through the two screw holes 42 on the two opposite sides of the case 40 to inwardly screw the bracket 52 so as to fasten the bracket 52 inside the case 40.

Figure 9:
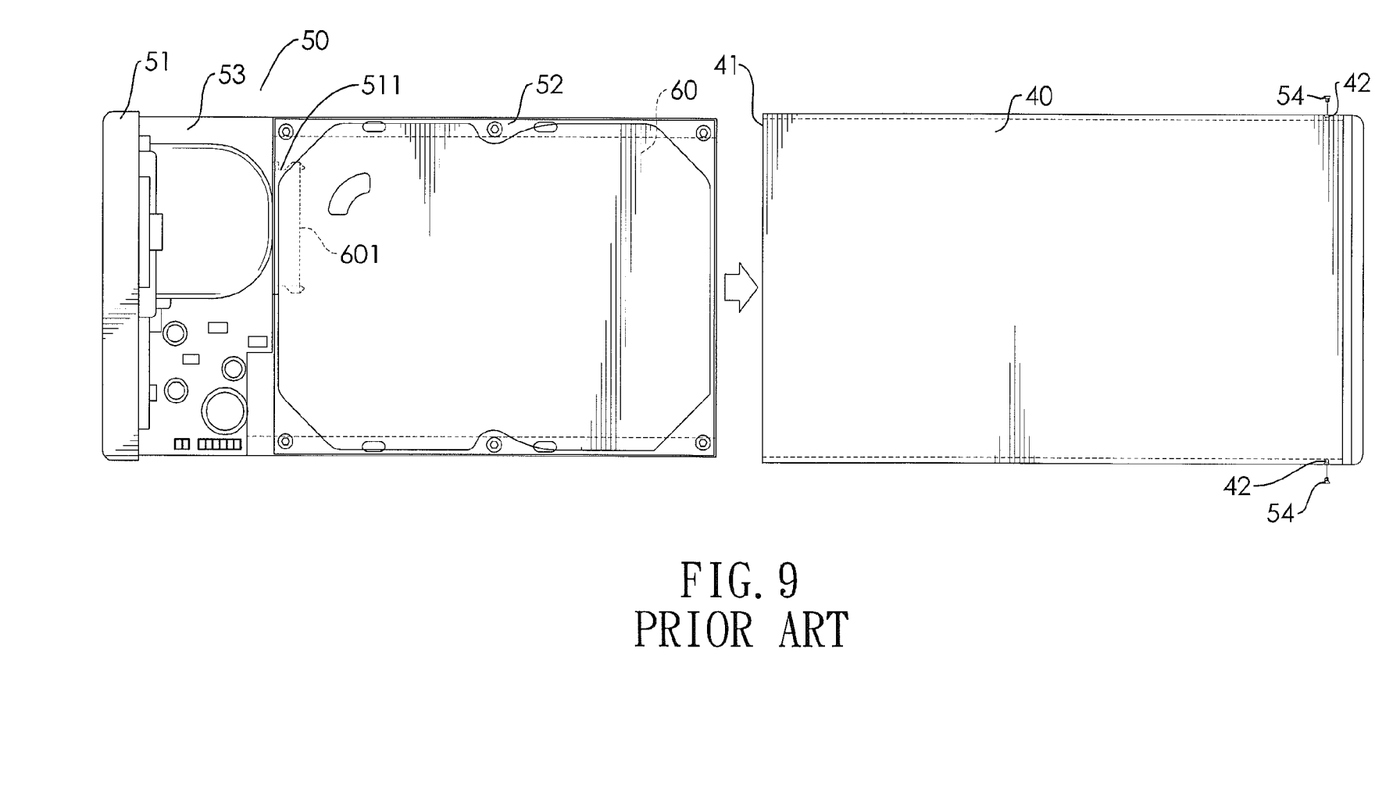
FIG. 9 is a partially exploded top view of the conventional external hard drive enclosure in FIG. 7.

With reference to FIG. 9, a hard drive 60 is mounted in the bracket 52, plugged in the hard drive port 511 and fixed on the bracket 52. The bracket 52 is inserted in the case 40 through the front opening 41 so that the control panel 51 is covered on the front opening 41 of the case 40. The two screws 54 then screw the bracket 52 respectively through the two screw holes 42 of the case 40 so that the bracket 52 are fastened with the case 40. If intending to remove and replace the hard drive 60, the two screws 54 must be unscrewed first. After the bridge device 50 is pulled out from the front opening 41 of the case 40, the hard drive 60 is unplugged from the hard drive port 511. A different hard drive 60 can be mounted again by repeating the foregoing assembling procedures.

Although the conventional external hard drive enclosure serves to externally connect with a computer, it is inconvenient to replace the hard drive in the conventional external hard drive enclosure. Besides, the case and the rectangular bracket may not be compatible with a hard drive to be replaced with and having a different size. For example, an external hard drive enclosure for a 3.5" hard drive is not compatible with a 2.5" hard drive, and vice versa.

SUMMARY OF THE INVENTION

In view of the drawback of inconveniently replacing the hard drive inside the foregoing external hard drive enclosure, a first objective of the present invention is to provide an open external hard drive enclosure for users to conveniently replace a hard drive inserted therein.

To achieve the foregoing objective, the open external hard drive enclosure has a body, a hard drive port, at least one computer port, a power input port, a control circuit and a lever.

The body has a top, a front and an opening. The open chamber is recessed from the top and the front to define a top opening and a front opening, has an inner bottom, two opposite inner long sidewalls and an inner short sidewall, and is adapted to match a size of a hard drive.

The hard drive port is mounted in the body and protrudes from the inner short sidewall of the body and into the open chamber.

The at least one computer port is mounted in and protrudes beyond the body.

The power input port is mounted in and protrudes beyond the body.

The control circuit is mounted in the body and electrically connected with the hard drive port, the at least one computer port and the power input port.

The lever is pivotally mounted on the inner short sidewall of the body and located above the hard drive port.

Given the open chamber and the lever, a hard drive inserted in the open chamber and engaging the hard drive port can be pushed out of the open chamber by the lever and disengaged from the hard drive port.

A second objective of the present invention is to provide an open external hard drive enclosure. To achieve the foregoing objective, the body of the open external hard drive enclosure further has a recess and a guide piece.

The recess is formed in the inner bottom and has two long sides, two pivot holes, an arch opening and a gap.

The pivot holes are formed in two opposite inner walls of the recess.

The arch opening is formed in a portion of the inner bottom abutting one of the long sides.

The gap is formed in a portion of the inner bottom abutting a center of the other of the long sides of the recess.

The guide piece has two long edges, two pivot pins and a fastener.

The long edges are parallel with the two inner long sidewalls.

The pivot pins are pivotally and respectively mounted in the two pivot holes.

The fastener is formed on and protrudes from one of the long edges to correspond to the gap of the recess.

Given the structure of the guide piece and the recess, the guide piece is flush with the inner bottom surface of the body when the guide piece is received in the recess. The guide piece is flipped up and fixed vertically by digging the long edge of the guide piece adjacent to the arch opening, pivotally flipping up the guide piece and fixing the fastener of the guide piece in the gap of the recess, so as to receive a hard drive with a smaller size in a space of the open chamber defined by the corresponding sidewalls and the erected guide piece.

DETAILED DESCRIPTION OF THE INVENTION

Figure 1:
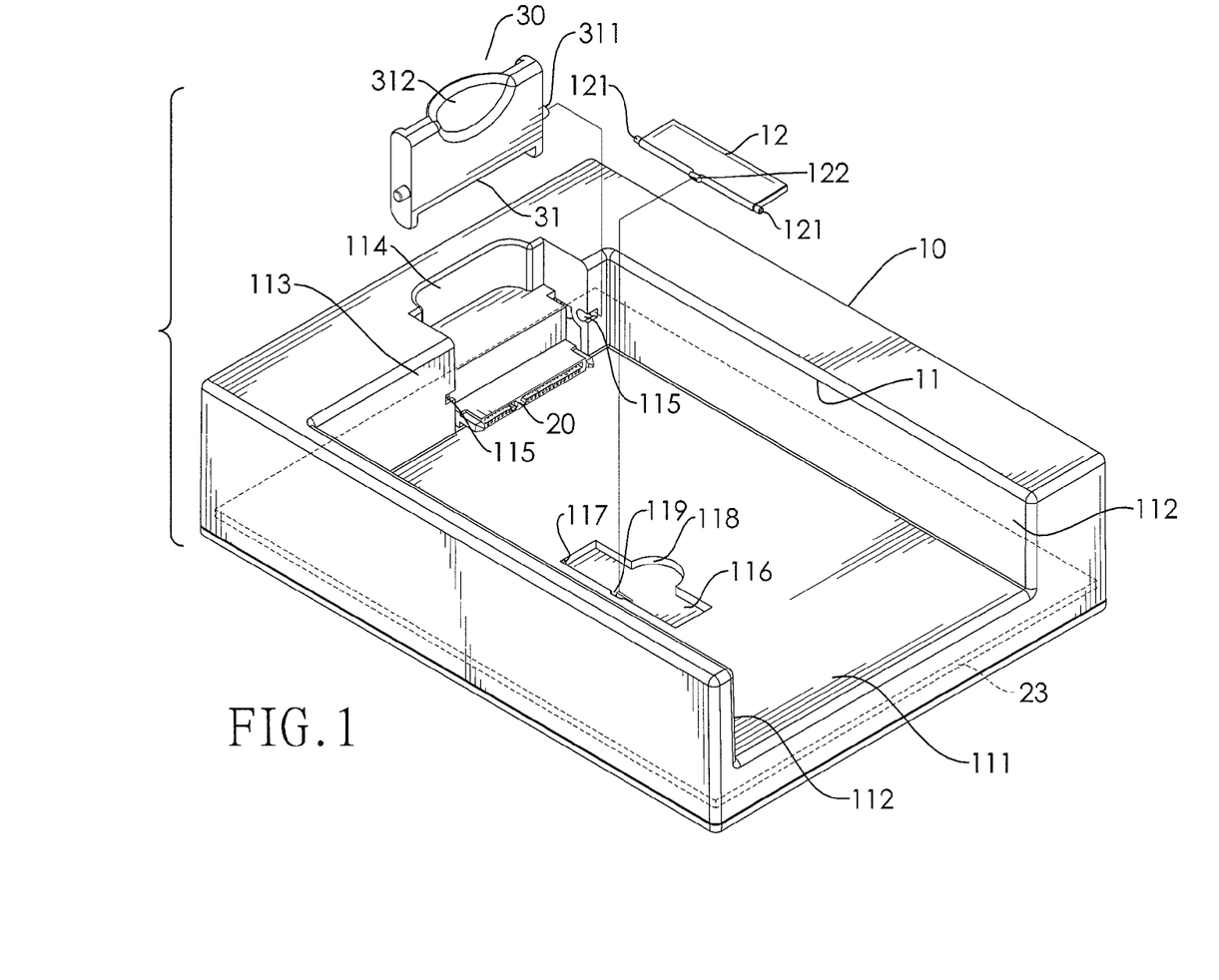
FIG. 1 is a partially exploded perspective view of an open external hard drive enclosure in accordance with the present invention.
Figure 2:
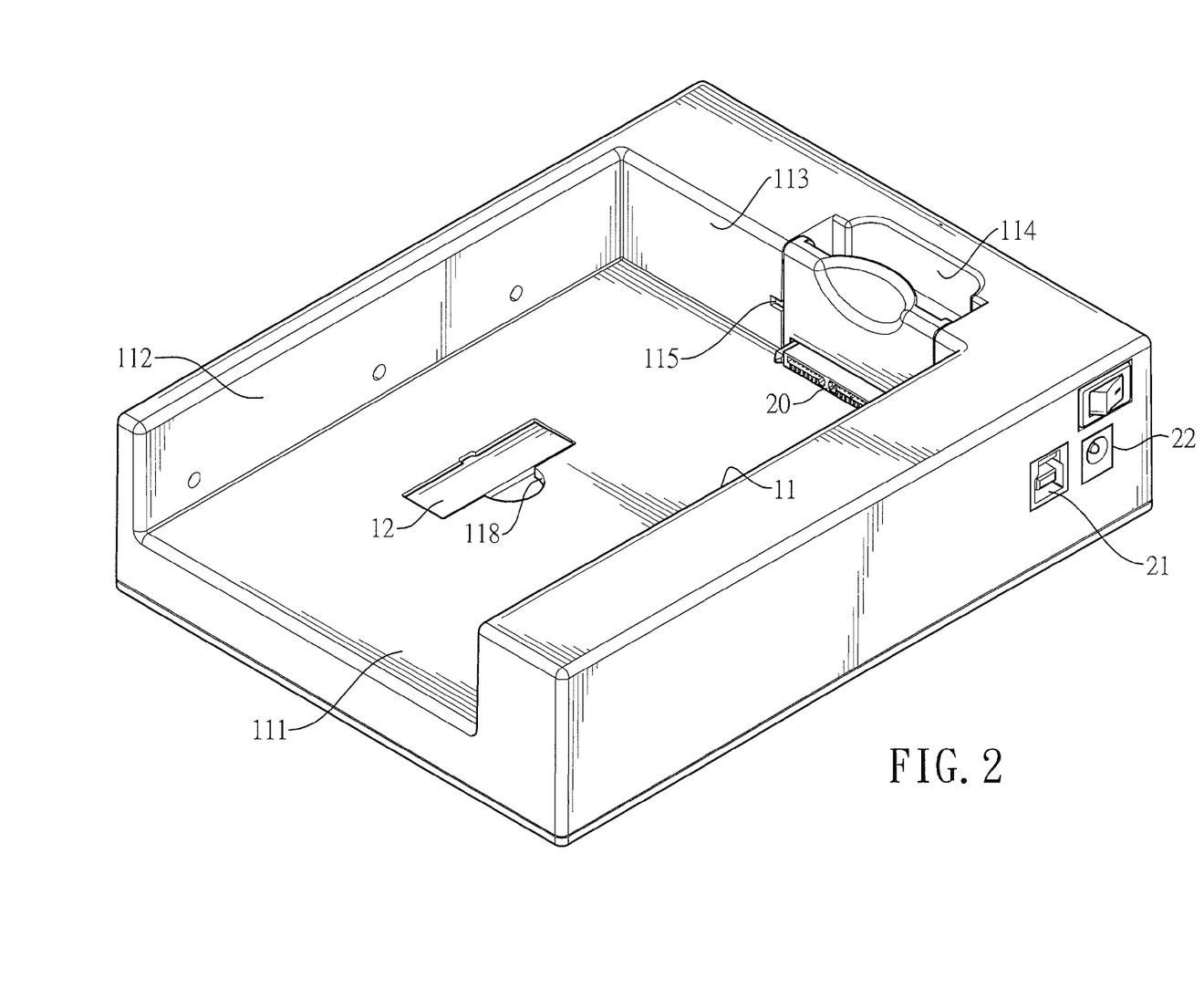
FIG. 2 is a perspective view of the open external hard drive enclosure in FIG. 1.

With reference to FIGS. 1 and 2, an open external hard drive enclosure in accordance with the present invention has a body 10, a hard drive port 20, at least one computer port 21, a power input port 22, a control circuit 23 and a lever 30.

The body 10 has a top, a front, and an open chamber 11. The open chamber 11 is recessed from the top and the front of the body 10 to define a top opening and a front opening. Further, the open chamber 11 has an inner bottom 111, two opposite inner long sidewalls 112 and an inner short sidewall 113, and matches a size of a 3.5" hard drive.

The hard drive port 20 is mounted in the body 10 and protrudes from the inner short sidewall 113 of the body 10 and into the open chamber 11. The hard drive port 20 may be a SATA port.

The at least one computer port 21 is mounted in the body 10 and protrudes beyond the body 10. Each one of the at least one computer port 21 is plugged in by a compatible connector of a computer to connect the computer with the computer port 21. The computer port 21 is a USB port.

The power input port 22 is mounted in and protrudes beyond the body 10, and may be a DC power connector.

The control circuit 23 is mounted in the body and electrically connected with the hard drive port 20, the at least one computer port 21 and the power input port 22 to convert signals between the computer and the hard drive in a full-duplex manner.

Figure 4A:
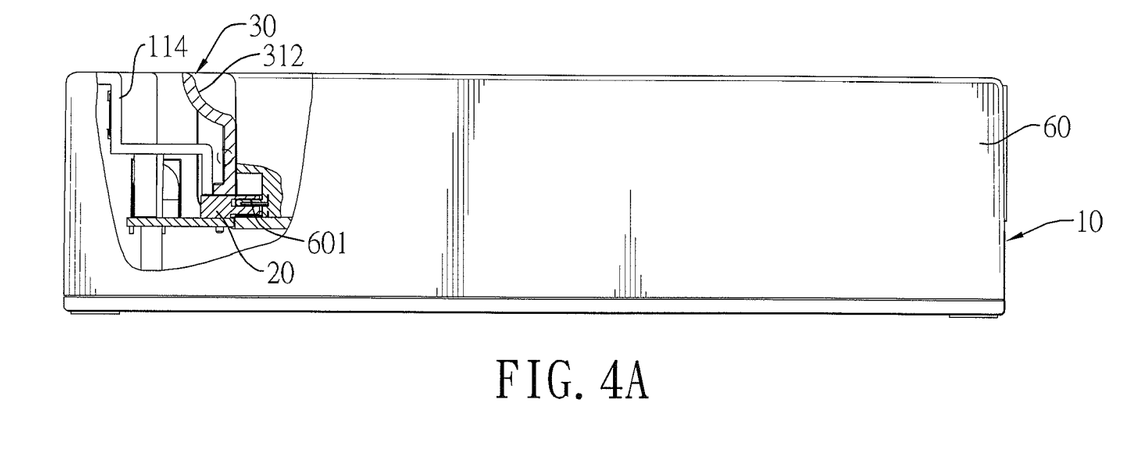
FIG. 4A is a side view in partial section of the open external hard drive enclosure in FIG. 2.

With reference to FIG. 4A, the lever 30 is pivotally mounted on the inner short sidewall 113 of the body 10 and is located above the hard drive port 20. The lever 30 has a lever body 31, two pivot pins 311 and a curved indentation 312. The lever body 31 is flat and takes a form of a rectangular column. The two pivot pins 311 are coaxially and respectively formed on and protrude from two opposite sides of the lever body 31. The curved indentation 312 is formed in a top of the lever body 31 and serves to be held by user's fingers.

Figure 4B:
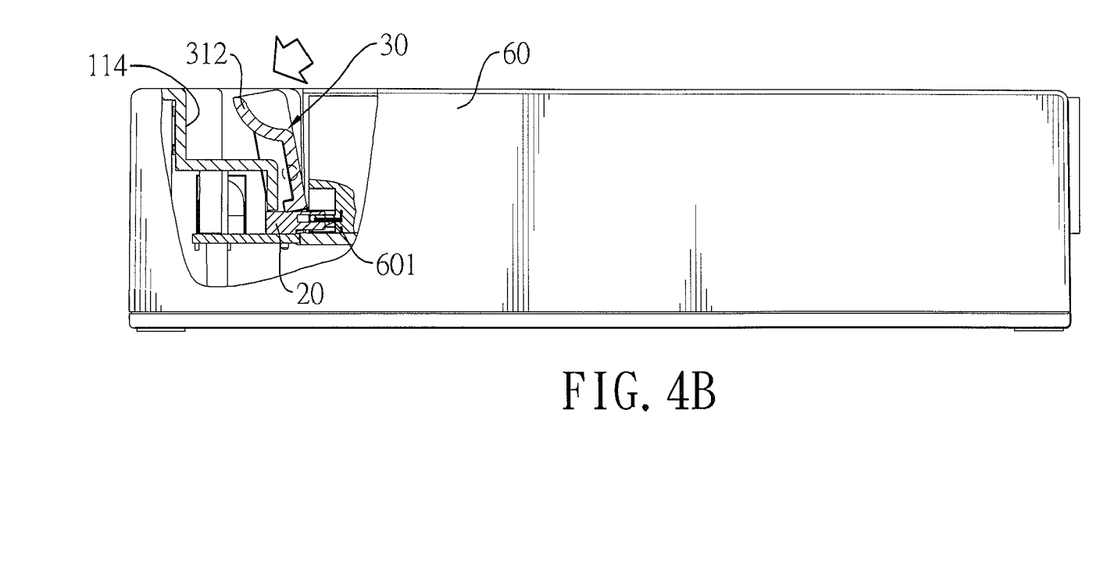
FIG. 4B is another side view in partial section of the open external hard drive enclosure in FIG. 2.

To accommodate the lever 30, a stepwise indentation 114 is formed in the body 10 and recessed from the top of the body 10 and the inner short sidewall 113 of the body 10. Two pivot slots 115 are formed in two opposite inner walls of the stepwise indentation 114 for the two pivot pins 311 to be pivotally and respectively mounted therein. When the two pivot pins 311 are mounted in the two pivot slots 115 and the lever body 31 is upright, a front surface of the lever body 31 is flush with the inner short sidewall 113 of the body 10. Thus, the stepwise indentation 114 provides a pivot space for the lever 30. That is, when the top of the lever body 31 is pivoted rearwardly, the bottom of the lever body 31 tilts toward to the open chamber 11 as shown in FIG. 4B.

Figure 3:
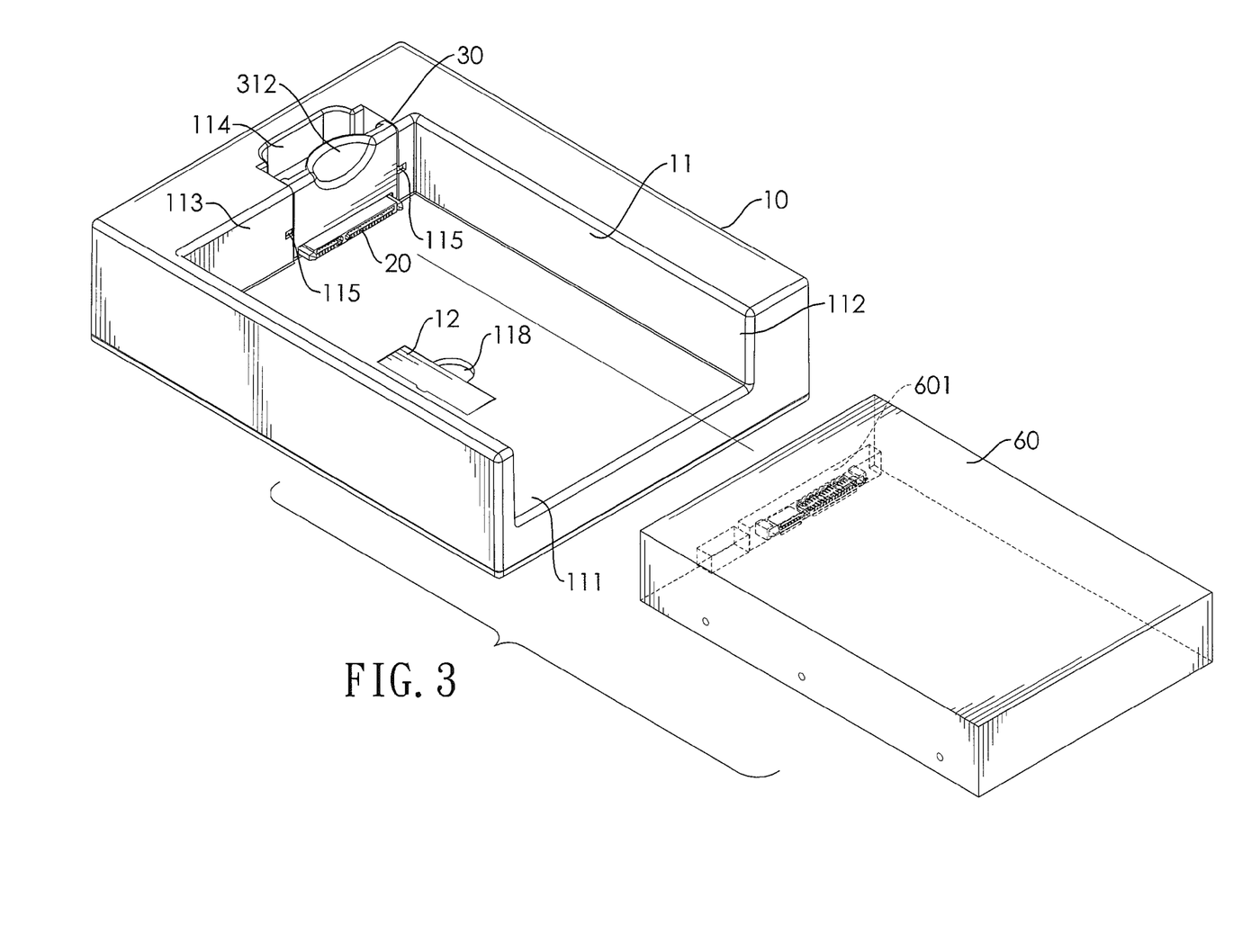
FIG. 3 is a partially exploded perspective view of the open external hard drive enclosure in FIG. 1.

With reference to FIGS. 3 and 4A, when mounting a hard drive 60, align an electrical connector 601 of the hard drive port 20 with the hard drive port 20 in the open chamber 11, insert the hard drive 60 from the front opening into the open chamber 11 of the body 10, and engage the electrical connector 601 of the hard drive 60 with the hard drive port 20, so that the hard drive 60 abuts against the inner short sidewall 113 and the two inner long sidewalls 112 of the body 10. With reference to FIG. 4B, when replacing the hard drive 60, use fingers to hold and pull the curved indentation 312 of the lever body 31 rearwardly toward the stepwise indentation 114, so that a bottom of the lever body 31 pivotally tilts up to push the hard drive 60 away from the inner short sidewall 113, the electrical connector 601 of the hard drive 60 disengages from the hard drive port 20, and the hard drive 60 is removed and replaced with another new hard drive.

Figure 5:
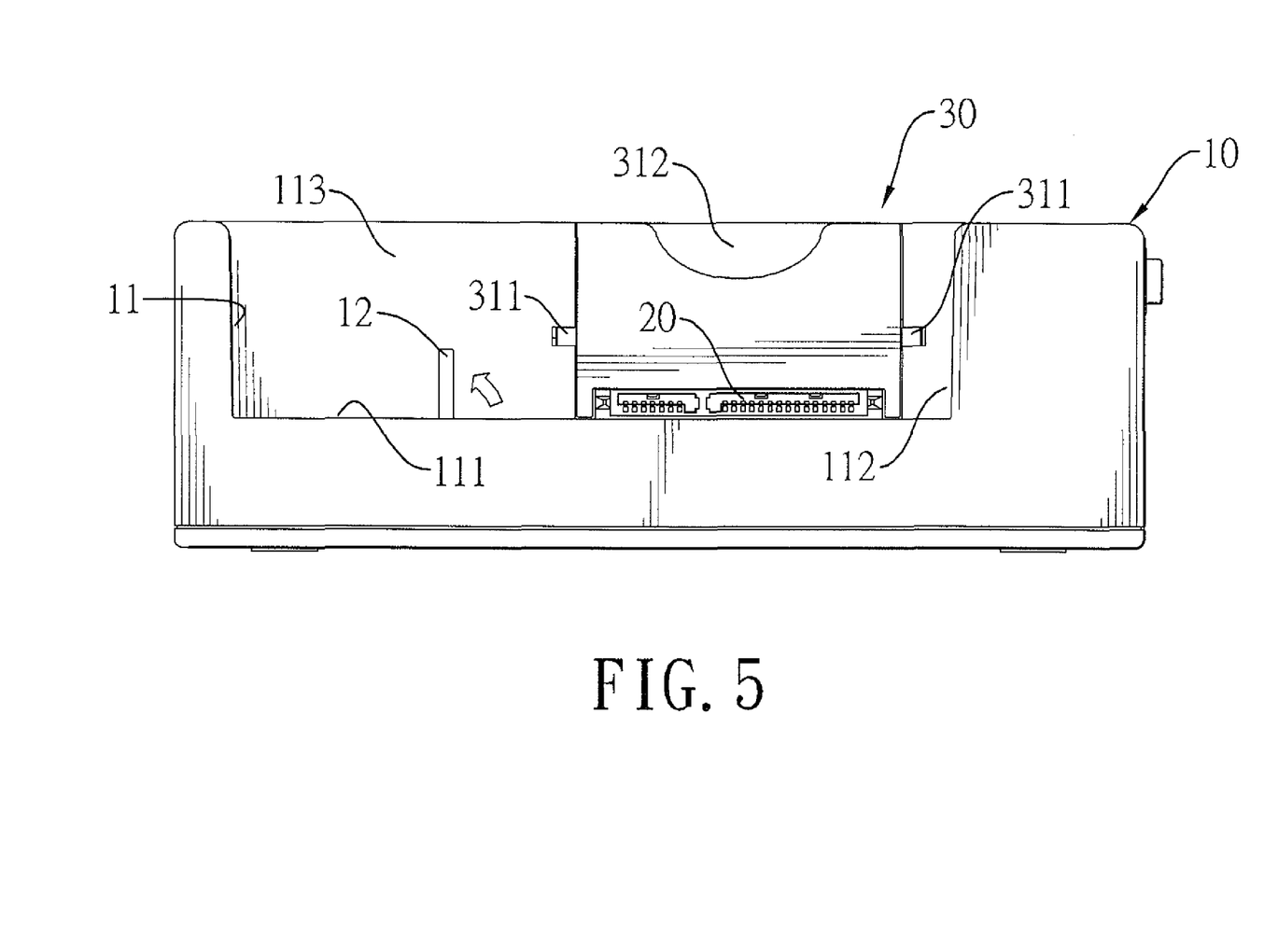
FIG. 5 is a rear view of the open external hard drive enclosure in FIG. 2.
Figure 6:
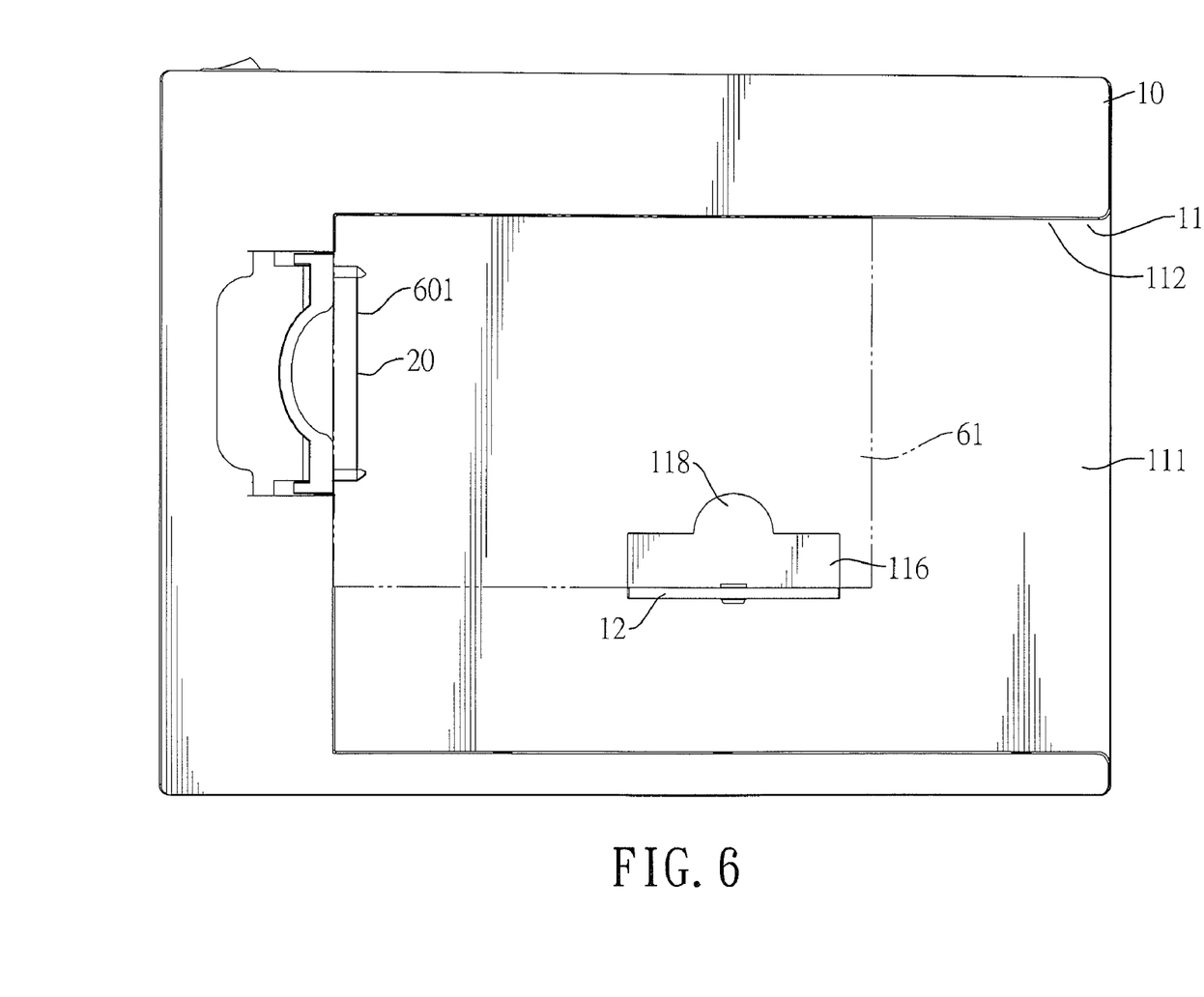
FIG. 6 is a top view of the open external hard drive enclosure in FIG. 2.

To mount a hard drive with a smaller size (for example: a 2.5" hard drive), with reference to FIG. 1, the body 10 further has a recess 116 formed in the inner bottom 111 and having two long sides, an arch opening 118, two pivot holes 117 and a gap 119. The arch opening 118 is formed through a portion of the inner bottom 111 abutting one of the long sides of the recess 116. The two pivot holes 117 are respectively formed in two opposite inner walls of the recess 116. The gap 119 is formed in a portion of the inner bottom 111 abutting a center of the other of the long sides of the recess 116. The body 10 further has a guide piece 12. The guide piece 12 has two long edges, two pivot pins 121 and a fastener 122. The long edges are parallel with the two inner long sidewalls 112. Each one of the two pivot pins 121 is formed on and protrudes from one end of one of the two long edges and is pivotally mounted in one of the two pivot holes 117. The fastener 122 is formed on and protrudes from one of the long edges to correspond to the gap 119. The guide piece 12 has a thickness matching a depth of the recess 116. Therefore, when the guide piece 12 is received in the recess 116, the guide piece 12 is level with the inner bottom 111. When a hard drive with a smaller size is mounted in the open chamber 11, the guide piece 12 is flipped up and fixed vertically as shown in FIG. 5 by digging the long edge of the guide piece 12 adjacent to the arch opening 118, pivotally flipping up the guide piece 12 and fixing the fastener 122 in the gap 119 vertically. With reference to FIG. 6, a 2.5" hard drive 61 can then be inserted in a space of the open chamber 11 delimited by the guide piece 12, the inner short sidewall 113 and one of the inner long sidewalls 112. In collaboration with the guide piece 12, the open external hard drive enclosure can receive and engage the hard drives 60, 61 with different sizes.

In sum, the open external hard drive enclosure of the present invention is feasible for users to easily replace hard drives and is flexible to engage with hard drives with different sizes.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An open external hard drive enclosure, comprising:
 a body having:
  a top;
  a front;
  an open chamber recessed from the top and the front to define a top opening and a front opening and having an inner bottom, two opposite inner long sidewalls and an inner short sidewall, and adapted to match a size of a hard drive; and
  a stepwise indentation formed in the body, recessed from the top of the body and the inner short sidewall of the body, and having two pivot slots formed in two opposite inner walls of the stepwise indentation for the two pivot pins to be pivotally and respectively mounted therein so that a front surface of the lever body is level with the inner short sidewall of the body when the lever body is upright;

a hard drive port mounted in the body and protruding from the inner short sidewall of the body and into the open chamber;

at least one computer port mounted in and protruding beyond the body;

a power input port mounted in and protruding beyond the body;

a control circuit mounted in the body and electrically connected with the hard drive port, the at least one computer port and the power input port; and a lever pivotally mounted on the inner short sidewall of the body, located above the hard drive port, and having:

a lever body being flat, taking a form of a rectangular column and having a front surface;

two pivot pins coaxially and respectively formed on and protruding from two opposite sides of the lever body; and a curved indentation formed in a top of the lever body.

2. The open external hard drive enclosure as claimed in claim 1, wherein the body further has:

a recess formed in the inner bottom and having:

two long sides; and two pivot holes formed in two opposite inner walls of the recess; and a guide piece having:

two long edges being parallel with the two inner long sidewalls; and two pivot pins pivotally and respectively mounted in the two pivot holes.

3. The open external hard drive enclosure as claimed in claim 2, wherein the recess further has:

an arch opening formed in a portion of the inner bottom abutting one of the long sides; and a gap formed in a portion of the inner bottom abutting a center of the other of the long sides of the recess;

the guide piece further has:

a fastener formed on and protruding from one of the long edges to correspond to the gap of the recess.

4. The open external hard drive enclosure as claimed in claim 2, wherein a thickness of the guide piece matches a depth of the recess so that the guide piece is flush with the inner bottom surface of the body when the guide piece is received in the recess.

5. The open external hard drive enclosure as claimed in claim 3, wherein a thickness of the guide piece matches a depth of the recess so that the guide piece is flush with the inner bottom surface of the body when the guide piece is received in the recess.

6. The open external hard drive enclosure as claimed in claim 5, wherein the guide piece is flipped up and fixed vertically by digging the long edge of the guide piece adjacent to the arch opening, pivotally flipping up the guide piece and fixing the fastener of the guide piece in the gap of the recess.

* * * * *